(12) United States Patent
Yoon et al.

(10) Patent No.: US 9,466,837 B1
(45) Date of Patent: Oct. 11, 2016

(54) BATTERY HAVING NEGATIVE ELECTRODE INCLUDING AMORPHOUS CARBON

(75) Inventors: Sang Young Yoon, Saugus, CA (US); Manabu Tanaka, Valencia, CA (US); Hiroshi Nakahara, Santa Clarita, CA (US)

(73) Assignee: Quallion LLC, Sylmar, CA (US)

( * ) Notice: Subject to any disclaimer, the term of this patent is extended or adjusted under 35 U.S.C. 154(b) by 2337 days.

(21) Appl. No.: 11/284,861

(22) Filed: Nov. 22, 2005

Related U.S. Application Data

(63) Continuation-in-part of application No. 11/175,879, filed on Jul. 5, 2005, now abandoned.

(51) Int. Cl.
*H01M 4/583* (2010.01)
*H01M 4/133* (2010.01)

(52) U.S. Cl.
CPC ............. *H01M 4/583* (2013.01); *H01M 4/133* (2013.01)

(58) Field of Classification Search
CPC .................................................... H01M 4/583
USPC ......................................................... 429/231.8
See application file for complete search history.

(56) References Cited

U.S. PATENT DOCUMENTS

| | | | |
|---|---|---|---|
| 6,440,610 B1* | 8/2002 | Sheem et al. ............. | 429/231.8 |
| 2002/0168574 A1 | 11/2002 | Ahn et al. | |
| 2003/0099883 A1 | 5/2003 | Ochoa et al. | |
| 2005/0019670 A1* | 1/2005 | Amine et al. ............... | 429/326 |
| 2005/0153205 A1 | 7/2005 | Hisashi et al. | |
| 2007/0082265 A1* | 4/2007 | Itou et al. ..................... | 429/223 |

FOREIGN PATENT DOCUMENTS

| | | | | |
|---|---|---|---|---|
| JP | WO2005/055344 | * | 6/2004 | ............. H01M 4/00 |
| WO | WO 03/078326 | | 9/2003 | |

\* cited by examiner

*Primary Examiner* — Barbara Gilliam
(74) *Attorney, Agent, or Firm* — Gavrilovich, Dodd & Lindsey, LLP

(57) ABSTRACT

The secondary battery includes one or more anodes that include amorphous carbon and a carbon fiber. In some instances, the one or more anodes exclude graphite. The battery also includes one or more cathodes and an electrolyte in contact with the one or more anodes. The electrolyte includes one or more lithium salts in a solvent.

14 Claims, 2 Drawing Sheets

BATTERY HAVING NEGATIVE ELECTRODE INCLUDING AMORPHOUS CARBON

REFERENCE TO RELATED APPLICATIONS

This application is a continuation-in-part of U.S. patent application Ser. No. 11/175,879, filed on Jul. 5, 2005, now abandoned entitled "Battery Having Negative Electrode Including Amorphous Carbon," and incorporated herein in its entirety.

STATEMENT REGARDING FEDERALLY SPONSORED RESEARCH OR DEVELOPMENT

This invention was made with United States Government support under contract DAAB07-03-C-B411 awarded by the U.S. Army Communications-Electronic Research & Engineering Center. The United States Government has certain rights in this invention.

FIELD

The present invention relates to electrochemical devices, and more particularly to electrochemical devices having an anode that includes amorphous carbon.

BACKGROUND

The increased demand for lithium batteries has resulted in research and development to improve the safety and performance of these batteries. Graphite has often been used in anode of these batteries as a result of its high material density and low irreversible capacity. However, anodes that include graphite have not been suitable for applications that require high power levels and high safety levels such as hybrid electric vehicles (HEV) batteries or power tool batteries. As a result, there is a need for a lithium battery that is suitable for applications that require high power levels and high safety levels.

SUMMARY

A secondary battery is disclosed. The battery includes one or more anodes that include amorphous carbon and a carbon fiber. In some instances, the one or more anodes exclude graphite. The battery also includes one or more cathodes and an electrolyte in contact with the one or more anodes. The electrolyte includes one or more lithium salts in a solvent.

The amorphous carbon can be a hard carbon or a soft carbon heat treated at less than 2000° C. The carbon fiber can be vapor grown carbon fiber. The carbon fiber can be less than 20 wt % of the anode active materials, less than 10 wt % of the anode active materials, or less than 5 wt % of the anode active materials. In some instances, the carbon fibers are present in a range of 1 wt % to 6 wt % of the amorphous carbon.

At least one of the one or more cathodes can include an active material having an exothermic peak temperature above 250° C., 270° C. or 300° C. when measured by differential scanning calorimetry in an argon atmosphere when the battery is fully charged. For instance, at least one of the one or more cathodes can include an active material selected from a group consisting of: spinnel, olivine, and lithium nickel cobalt manganese oxide. In some instances, at least one of the one or more cathodes includes $LiNi_{(1/3)}Co_{(1/3)}Mn_{(1/3)}O_2$.

A method of forming a battery is also disclosed. The method includes coating the amorphous carbon with the carbon fiber. The method also includes employing the amorphous carbon coated with carbon fiber as an active material in an anode of the secondary battery.

DESCRIPTION

A secondary battery is disclosed. The battery has an anode that includes a combination of amorphous carbon and carbon fiber. The inventors have found that the presence of a highly conductive carbon fiber enhances the conductivity of the amorphous carbon such that the amorphous carbon becomes effective for high power applications such as power tool batteries and HEV batteries. Additionally, the amorphous carbon does not form the passivation layer that is often associated with graphite. Graphite tends to decompose during formation of the passivation layer in the presence of solvents such as propylene carbonate (PC) that are known to provide highly conductive electrolytes. Since amorphous carbon does not form this passivation layer, amorphous carbon is not associated with this decomposition and can yield a battery with cycling performance superior to graphite. Additionally, since amorphous carbon does not form this passivation layer, amorphous carbon can be used with solvents such as PC. The use of these solvents can further enhance the high power performance of the battery.

The use of amorphous carbon can also provide a battery with enhanced safety characteristics. For instance, an anode that includes graphite can form a passivation layer that can be a source of thermal runaway. Because amorphous carbon is not associated with a passivation layer, the use of amorphous carbon can reduce this source of volatility.

Additionally, the inventors have found that anodes with amorphous carbon are effective in combination with stable cathode active materials. For instance, the battery can include one or more cathodes having cathode active materials with a differential scanning calorimetry exothermic peak temperature above 250° C., 270° C., or 300° C. as measured in an argon atmosphere when the battery is initially fully charged. As an example, at least one of the one or more cathodes can include an active material selected from a group consisting of: spinnel, olivine, and lithium nickel cobalt manganese oxide. In some instances, at least one of the one or more cathodes includes $LiNi_{(1/3)}Co_{(1/3)}Mn_{(1/3)}O_2$. These stable cathode active materials provide a battery with a safety level that is sufficient for use in high power applications such as HEV batteries and power tool batteries.

Figure 1:
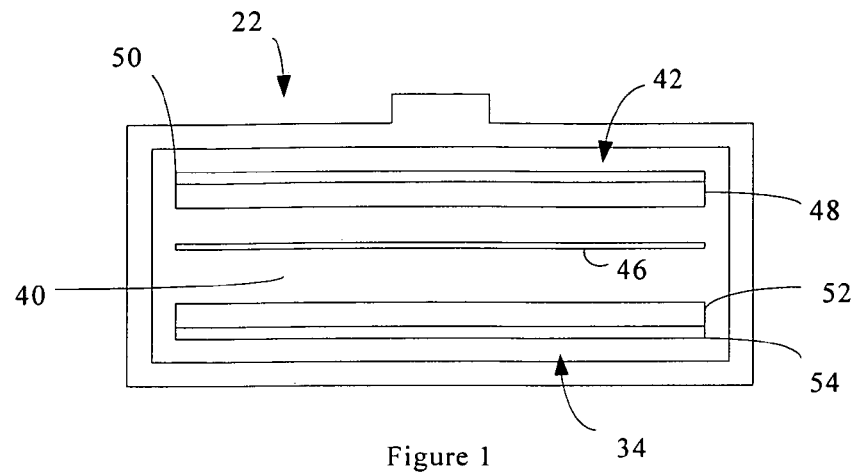
FIG. 1 is a schematic view of a battery.

FIG. 1 is a schematic view of a suitable battery 22. The battery 22 includes an electrolyte 40 activating a positive electrode or cathode 42 and an negative electrode or anode 34. A separator 46 is positioned between the cathode 42 and anode 34. The cathode 42 includes a cathode medium 48 on a cathode substrate 50. The anode 34 includes an anode medium 52 on an anode substrate 54. Although the battery is illustrated as including one anode and one cathode, the battery can include more than one anode and/or more than one cathode with the anodes and cathodes each separated by a separator. Additionally, the battery can have a variety of different configurations including, but not limited to, stacked configurations where multiple anodes and multiple cathodes are alternated in a stack, a "jellyroll" configurations, and wound configurations. In some instances, the battery is hermetically sealed. Hermetic sealing can reduce entry of impurities into the battery. As a result, hermetic sealing can reduce active material degradation reactions due to impurities. The reduction in impurity induced lithium consumption can stabilize battery capacity.

A suitable material for the anode substrate includes, but is not limited to, titanium, a titanium alloy, stainless steel, nickel, copper, tungsten, tantalum or alloys thereof.

The anode medium 52 includes or consists of one or more anode active materials. The anode active material can include or consist of amorphous carbon. Suitable amorphous carbons include, but are not limited to, hard carbon, and soft carbon heat treated at less than 2000° C. In some instances, the amorphous carbon has an average particle size in a range of 0.1 µm to 100 µm and/or a density in a range of 1.0 g/cc to 2.2 g/cc. In some instances, the anode active material excludes graphite. The anode medium can include one or more anode active materials in addition to the amorphous carbon. Suitable active materials for combining with the amorphous carbon include, but are not limited to, tin, compounds that include tin, silicon and compounds that include silicon. When the anode active material includes one or more anode active materials in addition to the amorphous carbon, the amorphous carbon is preferably more than 50 wt % of the anode active material, or more than 60 wt % of the anode active material, or more than 80 wt % of the anode active material.

The anode medium includes carbon fiber and preferably includes a highly conductive carbon fiber such as vapor grown carbon fiber (VGCF), carbon nanotubes, and/or carbon nanotubules. The carbon fibers can provide electrical pathways between the anode active materials. Prior anode active materials such as carbon beads are known to break electrical contact as the anode changes size during repeated charge and discharge of the battery. These breaks cause a portion of the active material to become electrically isolated during charge and discharge of the battery. The carbon fibers can serve to retain this contact as the size of the active materials change during the charge and discharge of the battery.

Suitable carbon fibers for use in the anode have an average diameter of less than 5 µm. In some instances, the average diameter is 0.05 µm to 5 µm or 0.01 µm to 5 µm. The fibers can have agglomerations with an average size less than 500 µm where the size of an agglomeration is the longest dimension of the agglomeration. In some instances, the average agglomerate size is 5 µm to 500 µm. In a preferred example, none of the agglomerates are larger than 500 µm or smaller than 5 µm. The average fiber length can be less than 100 um and/or greater than 5 um. An example of suitable carbon fibers is vapor grown carbon fiber (VGCF) and carbon nanotubules.

The carbon fibers are preferably present in the anode in an amount sufficient to provide electrical pathways between the anode active materials. In some instances, the anode is constructed such that the carbon fibers are less than 20 wt % of the anode active materials. Preferably, the carbon fibers are less than 10 wt % of the anode active materials, or less than 5 wt % of the anode active materials. The carbon fibers can present in a range of 1 wt % to 6 wt % of the anode active materials or in a range of 2 wt % to 5 wt % of the anode active materials. Carbon fiber content less than 8 wt % can be preferred to allow the carbon fibers to provide electrical pathways between the carbon beads. As the wt % of the carbon fibers increases, the adhesive force can decrease because the high specific surface area begins to absorb the binder material so the binder material cannot serve as an adhesive in the negative electrode. The decreased adhesion is believed to reduce the number of available electric paths in the electrode and to accordingly degrade cycling performance.

The anode medium can optionally include conductors in addition to the carbon fiber. Suitable conductors include, but are not limited to, acetylene black, carbon black, metal whisker such as nickel whisker, and/or graphite. These conductors can serve to further enhance the high rate capabilities of the battery.

In some instances, the anode medium includes a binder. When a binder is used in the anode medium, a suitable binder includes, but is not limited to, PVdF, Ethylene Propylene Diene Monomer (EPDM), styrene butadiene rubber (SBR) and/or carboxy methyl cellulose (CMC). In some instances, the binder excludes fluorine. In some instances, styrene butadiene rubber (SBR) is added to impart elasticity to the mixture.

The anode can be generated by generating a slurry that includes or consists of the components of the anode medium. The slurry can be coated onto one or both sides of a substrate, dried and pressed to the desired thickness. The result can be cut to extract an anode having the desired shape.

In some instances, the carbon fiber and the amorphous carbon are fused before forming the slurry. Fusion can provide direct adhesion of the carbon fiber to the amorphous carbon and can accordingly provide more intimate contact between the amorphous carbon and the carbon fiber to improve the electrical pathways in the anode and/or reducing breaking of electrical contacts in the anode. As an example, MECHANOFUSION® available from Hosokawa Micron Ltd. located in Japan can be employed to fuse one or more cathode active materials and the carbon fiber or to coat one or more cathode active with the carbon fiber. MECHANOFUSION® fuses the carbon fiber to the amorphous carbon by concurrently compressing and shearing the carbon fiber and the amorphous carbon. The fusion effectively adheres the carbon fiber to the surface of the cathode active material. When MECHANOFUSION® is employed to fuse carbon fiber and the amorphous carbon, the result is a powder that can be employed in the slurry.

Suitable cathode substrates 50 include, but are not limited to, stainless steel, titanium, tantalum, platinum, aluminum, gold, nickel, or an alloy thereof.

The cathode medium 48 includes or consists of one or more cathode active materials. Suitable cathode active materials include, but are not limited to, $LiNi_{1-x}Co_yMe_zO_2$, $LiMn_{0.5}Ni_{0.5}O_2$, $LiMn_{0.3}Co_{0.3}Ni_{0.3}O_2$, $LiFePO_4$, $LiMn_2O_4$, $LiFeO_2$, $LiMc_{0.5}Mn_{1.5}O_4$, $LiMn_{1.5}McO_4$, vanadium oxide, carbon fluoride and mixtures thereof wherein Me is Al, Mg, Ti, B, Ga, Si, Mn, Zn, Mo, Nb, V and Ag and combinations thereof, and wherein Mc is a divalent metal such as Ni, Co, Fe, Cr, Cu, and combinations thereof. Preferred cathode materials include one or more lithium transition metal oxides selected from the group consisting of $LiNi_{1-x}Co_yM$-

$e_2O_2$, $LiMn_{0.5}Ni_{0.5}O_2$, $LiMn_{0.3}Co_{0.3}Ni_{0.3}O_2$, $LiFePO_4$, $LiMn_2O_4$, $LiFeO_2$, $LiMc_{0.5}Mn_{1.5}O_4$.

TABLE 1

| Positive active material (4.2 V vs. Li/Li+) | Peak temperature/° C. |
| --- | --- |
| LiCoO2 | 236 |
| LiMn2O4 | 281 |
| LiNiCoMnO2 | 295 |
| LiFePO4 (3.8 V) | 252 |

In some instances, the cathode medium employs cathode active materials that are stable materials to provide a battery having an enhanced safety levels suitable for use in hybrid electric vehicles (HEV) batteries and/or power tool batteries. Stable cathode active media have an exothermic peak temperature above 250° C., 250° C., or 250° C. when measured by differential scanning calorimetry (DSC) in an argon atmosphere after initially fully charging the battery. In some instances, the battery is charged to 3.8 V or 4.2 V depending on the choice of cathode active material. For instance, a battery with $LiFePO_4$ as a cathode active material can be charged to about 3.8 V where a battery with $Li_2Mn_2O_x$ as a cathode active material can be charged to about 4.2 V. The batteries can be charged with a current of 14 mA/g using an electrolyte that is 1.0 M $LiPF_6$ in a 1/2 by volume mixture of ethylene carbonate (EC)/diethyl carbonate (DEC). Examples of suitable cathode active materials include, but are not limited to, spinel such as $LiMn_2O_4$, layered materials such as $LiNi_{(1/3)}Co_{(1/3)}Mn_{(1/3)}O_2$, $LiNiCoMnO_2$, and olivine materials such as $LiFePO_4$. Table 1 shows the exothermic peak temperature for a variety of cathode active media after the initial charge of the battery. Each of the active media included 86 wt % of the active material listed in Table 1, 7 wt % of Carbon Black and 7 wt % of PVdF. The exothermic peak temperatures were measured by differential scanning calorimetry (DSC) in an argon atmosphere from 30° C. to 400° C. at a rate of 2° C./min. The active media with $LiMn_2O_4$, $LiNiCoMnO_2$, and $LiFePO_4$ each have an exothermic peak above 250° C.

The cathode medium 48 can optionally include binders, conductors and/or diluents such as PVDF, graphite and acetylene black in addition to the one or more cathode active materials. Suitable binders include, but are not limited to, PVdF, powdered fluoropolymer, more preferably powdered polytetrafluoroethylene or powdered polyvinylidene fluoride present at about 1 to about 5 weight percent of the cathode active material. Suitable conductors and/or diluents include, but are not limited to, carbon fiber acetylene black, carbon black and/or graphite.

In some instances, the cathode medium includes carbon fiber. The carbon fibers can provide electrical pathways between the cathode active materials. The carbon fibers can serve to retain contact between the cathode active materials as the size of the cathode medium changes during the charge and discharge of the battery. Suitable carbon fibers for use in the cathode can have an average diameter of less than 5 μm. In some instances, the average diameter is 0.05 μm to 5 μm or 0.01 μm to 5 μm. The fibers can have agglomerations with an average size less than 500 μm where the size of an agglomeration is the longest dimension of the agglomeration. In some instances, the average agglomerate size is 5 μm to 500 μm. In a preferred example, none of the agglomerates are larger than 500 μm or smaller than 5 μm. The average fiber length can be less than 100 um and/or greater than 5 um. An example of suitable carbon fibers is vapor grown carbon fiber (VGCF) and nanotubes.

The carbon fibers are preferably present in the cathode in an amount sufficient to provide electrical pathways between the cathode active materials. In some instances, the cathode is constructed such that the carbon fibers are less than 8 wt % of the cathode active materials. Preferably, the carbon fibers are less than 6 wt % of the cathode active materials, less than 5 wt % of the cathode active materials. The carbon fibers can present in a range of 1 wt % to 6 wt % of the cathode active materials or in a range of 2 wt % to 5 wt % of the cathode active materials. Carbon fiber content less than 8 wt % can be preferred to allow the carbon fibers to provide electrical pathways between the carbon beads. As the wt % of the carbon fibers increases, the adhesive force can decrease because the high specific surface area begins to absorb the binder material so the binder material cannot serve as an adhesive in the negative electrode. The decreased adhesion is believed to reduce the number of available electric paths in the electrode and to accordingly degrade cycling performance.

To make a cathode, the cathode components are mixed together in a slurry. The slurry is applied to one or both sides of the cathode substrate, dried, and pressed or rolled to the desired thickness. The result can be cut to extract an anode having the desired shape.

Suitable separators 46 include, but are not limited to, polyethylene, fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, polytetrafluoroethylene membrane, polypropylene/polyethylene membrane commercially available under the designation CELGARD (Celanese Plastic Company, Inc.), and a polyethylene membrane commercially available from Tonen Chemical Corp.

The electrolyte includes one or more salts in a solvent. The electrolyte can be prepared such that the total concentration of the one or more salts in the solvent is about 0.3 to 2.0 M, about 0.5 to 1.5 M, or about 0.7 to 1.2 M. Suitable salts for use with the electrolyte include, but are not limited to, alkali metal salts including lithium salts. Examples of lithium salts include $LiClO_4$, $LiBF_4$, $LiAsF_6$, $LiPF_6$, $LiSbF_6$, $LiCF_3SO_3$, $LiC_6F_5SO_3$, $LiC(CF_3SO_2)_3$, $LiN(SO_2C_2F_5)_2$, $LiN(SO_2CF_3)_2$, (LiTFSI), $LiAlCl_4$, $LiGaCl_4$, $LiSCN$, $LiO_2$, $LiO_3SCF_3$, $LiO_2CCF_3$, $LiSO_6F$, $LiB(C_6H_5)_4$, Li-methide, Li-imide, lithium alkyl fluorophosphates and combinations thereof. Preferred salts include $LiPF_6$ and $LiBF_4$.

The solvent can include or consist of one or more organic solvents. Examples of suitable organic solvents include, but are not limited to, cyclic carbonates such as propylene carbonate (PC), ethylene carbonate (EC), butylene carbonate (BC) and vinylene carbonate (VC), linear carbonates such as dimethyl carbonate (DMC), diethyl carbonate (DEC), ethylmethyl carbonate (EMC) and dipropyl carbonate (DPC), dialkyl carbonates such as diglyme, trigylme, tetragylme, 1,2-dimethoxyethane (DME), methyl propyl carbonate, ethyl propyl carbonate, aliphatic carboxylate esters such as methyl formate, methyl acetate and ethyl propionate, gamma.-lactones such as .gamma.-butyrolactone, linear ethers such as 1,2-ethoxyethane (DEE) and ethoxymethoxyethane (EME), cyclic ethers such as tetrahydrofuran and 2-methyltetrahydrofuran, and aprotic organic solvents such as dimethylsulfoxide, 1,3-dioxolane, formamide, acetoamide, dimethylformamide, dioxolane, acetonitrile, propylnitrile, nitromethane, ethylmonoglyme, triester phosphate, timethoxymethane, dioxolane-derivatives, sulphorane, methylsulphorane, 1,3-diemthyl-2-imidazoline, 3-methyl-2-oxazolidinone, propylene carbonate-derivatives, tetrahydrofuran-derivatives, ethylether, 1,3-propanesultone, anisole, N-methylpyrrolidone and fluorinated carboxylate esters. In some instances, at least one of the one or more organic solvents is propylene carbonate (PC). In some instances, the solvent excludes organic solvents.

The solvent can include or consist of one or more polysiloxanes, tetrasiloxanes, trisiloxanes, disiloxanes and/or silanes. Examples of suitable polysiloxanes are disclosed in U.S. patent application Ser. No. 10/810,019, filed on Mar. 25, 2004, entitled "Polysiloxane for Use in Electrochemical Cells," and incorporated herein in its entirety. Examples of suitable tetrasiloxanes and tetrasiloxane electrolytes are disclosed in U.S. patent application Ser. No. 11/056,868, filed on Feb. 10, 2005, entitled "Electrochemical Device Having Electrolyte Including Tetrasiloxane," and U.S. patent application Ser. No. 10/971,926, filed on Oct. 21, 2004, entitled "Electrochemical Device Having Electrolyte Including Tetrasiloxane," and U.S. Provisional Patent Application Ser. No. 60/543,951, filed on Feb. 11, 2004, entitled "Siloxane," each of which is incorporated herein in its entirety. Examples of suitable trisiloxanes and trisiloxane electrolytes are disclosed in U.S. patent application Ser. No. 11/056,867, filed on Feb. 10, 2005, and entitled "Electrochemical Device Having Electrolyte Including Trisiloxane;" and U.S. patent application Ser. No. 10/971,913, filed on Oct. 21, 2004, entitled "Electrochemical Device Having Electrolyte Including Trisiloxane;" and U.S. Provisional Patent Application Ser. No. 60/543,951, filed on Feb. 11, 2004, entitled "Siloxane;" and U.S. Provisional Patent Application Ser. No. 60/542,017, filed on Feb. 4, 2004, entitled "Nonaqueous Electrolyte Solvents for Electrochemical Devices;" and U.S. Provisional Patent Application Ser. No. 60/543,898, filed on Feb. 11, 2004, entitled "Siloxane Based Electrolytes for Use in Electrochemical Devices;" each of which is incorporated herein in its entirety. Examples of suitable disiloxanes and disiloxanes electrolytes are disclosed in U.S. patent application Ser. No. 11/056,866, filed on Feb. 10, 2005, entitled "Electrochemical Device Having Electrolyte Including Disiloxane," and U.S. patent application Ser. No. 10/971,507, filed on Oct. 21, 2004, entitled "Electrochemical Device Having Electrolyte Including Disiloxane," and U.S. Provisional Patent Application Ser. No. 60/543,951, filed on Feb. 11, 2004, entitled "Siloxane," and U.S. Provisional Patent Application Ser. No. 60/542,017, filed on Feb. 4, 2004, entitled "Nonaqueous Electrolyte Solvents for Electrochemical Devices," and U.S. Provisional Patent Application Ser. No. 60/543,898, filed on Feb. 11, 2004, entitled "Siloxane Based Electrolytes for Use in Electrochemical Devices;" each of which is incorporated herein in its entirety. Examples of suitable silanes and silane electrolytes are disclosed in U.S. patent application Ser. No. 11/056,869, filed on Feb. 10, 2005, and entitled "Electrolyte Including Silane for Use in Electrochemical Devices;" and U.S. patent application Ser. No. 10/977,313, filed on Oct. 28, 2004, entitled "Electrolyte Including Silane for Use in Electrochemical Devices;" and in U.S. Provisional Patent Application Ser. No. 60/601,452, filed on Aug. 13, 2004, entitled "Electrolyte Including Silane for Use in Electrochemical Devices" each of which is incorporated herein in its entirety.

In some instances, the solvent includes one or more organic solvents in addition to one or more of the silanes and/or one or more of the siloxanes. Organic solvents can reduce the viscosity of the siloxanes and/or the silanes. When the solvent includes one or more organic solvents in addition to one or more siloxanes and/or one or more silanes, a suitable volume ratio of the total organic solvents to the total siloxane and silane is greater than 1:99, 1:9, or 3:7 and/or less than 9:1, 4:1 or 7:3. The solvent can include more than one of the siloxane or more than one silane. Further, the solvent can include one or more siloxanes combined with one or more silanes. The combination of a silane with other silanes and/or with other siloxanes can reduce the viscosity of the blended solvent. Additionally, the inventors believe that the silanes can improve the mobility of poly(alkylene oxide) in other siloxanes or silanes. Additionally, the combination of a silane with other silanes and/or siloxanes can increase the ability of the solvent to dissociate the salts employed in electrolyte and can accordingly increase the concentration of free ions in the electrolyte. These features can further enhance the ionic conductivity of the electrolytes.

The electrolyte can be a liquid. In some instances, the electrolyte is a solid or a gel. For instance, the electrolyte can include a network polymer that interacts with the solvent to form an interpenetrating network. The interpenetrating network can serve as a mechanism for providing a solid electrolyte or gel electrolyte. Alternately, the electrolyte can include one or more solid polymers that are each a solid at room temperature when standing alone. The solid polymer can be employed in conjunction with the solvent to generate an electrolyte such as a plasticized electrolyte as a solid or as a gel. Alternately, one or more silanes and/or one or more siloxanes in the solvent can be cross linked to provide a solid or gel electrolyte. A polysiloxane is an example of a cross-linkable solvent. Suitable examples for method of forming a cross linked polymer are disclosed in U.S. patent application Ser. No. 10/810,019, filed on Mar. 25, 2004, entitled "Polysiloxane for Use in Electrochemical Cells" and incorporated herein in its entirety.

The electrolyte can be generated by combining the one or more salts and the solvent. In some instances, other components are combined with the solvent. For instance, the monomers for an interpenetrating network can also be combined with the solvent. A suitable concentration for the salt in the electrolyte is a concentration greater than 0.1 M, 0.5 M or greater than 0.7 M and/or less than 1.5 M, less than 2 M, or less than 5 M. For instance, the electrolyte can include 0.8 M to 1.5 M $LiAsF_6$ or $LiPF_6$ in a 50:50 mixture, by volume, of propylene carbonate and 1,2-dimethoxyethane. Another example of the electrolyte includes electrolyte 1.2 M $LiBF_4$ in a 30:70 by volume mixture of PC and DME.

As noted above, the battery is suitable for high power applications. The battery can be configured to provide more than 110 watt-hours, more than 140 watt-hours or more than 160 watt-hours. The power of a battery can be increased by reducing the thickness of the cathode medium and/or the anode medium and increasing the surfaced area of the cathode medium and/or the anode medium. The capacity of a battery can be increased by increasing the thickness of the cathode medium and/or the anode medium. In some instances, the anode medium has a thickness less than 100 µm, less than 90 µm or less than 70 µm. High power batteries should use electrodes which provide good rate capability. The rate capability depends on the current density loaded at each C-rate. Thus, if the loading level of active material (the thickness of electrode, assumed the porosity is same at each electrode) gets larger, i.e, the current per unit area gets larger even if the cells is running at the same rate. As a result, the rate capability of cells can be strongly dependant on (or being limited by) thickness of both cathode and anode electrodes. At the same time, both cathode and anode electrodes need to be balanced to have an optimum capacity and long cycle life. As a result, the thickness of the anodes can limit the suitable thickness of the cathodes. A suitable cathode medium thickness includes a thickness less than 130 μm, less than 100 μm or 90 μm.

The battery can be a primary battery or a secondary battery. Further, the above cathode, anode and electrolyte combinations can be employed in other electrochemical devices such as capacitors and hybrid capacitors/batteries.

EXAMPLE 1

A first anode was prepared by mixing hard carbon powder (Carbotron F, Kureha Co., Ltd), carbon black (Super P, Timcal), and 13 wt % solution of PVDF in n-methyl pyrolidone (NMP, Kureha Co., Ltd., PVdF9130) in a mixer. The result was coated onto a 10 μm thickness of copper foil. The result was dried so as to provide an anode active material that was about 92 wt % hard carbon powder, 1 wt % Super P, and 7 wt % PVDF. Anodes were cut out of the result. The resulting anode had a width of about 65 mm, a length of about 95 mm, and a thickness of less than 7 mm.

A second anode was prepared by mixing Mesocarbon Microbeads (Osaka Gas Co., Ltd., MCMB 1028), carbon black (Super P, Timcal), and 13 wt % solution of PVDF in n-methyl pyrolidone (NMP, Kureha Co., Ltd., PVdF9130) in a mixer. The result was coated onto a 10 μm thickness of copper foil. The result was dried so as to provide an anode active material that was about 92 wt % MCMB, 1 wt % Super P, and 7 wt % PVDF. Anodes were cut out of the result. The resulting anode had a width of about 65 mm, a length of about 95 mm, and a thickness of less than 7 mm.

First cathodes were generated by mixing $LiMn_2O_4$ (Mitsubishi Chemical), carbon fiber (Super P, Timcal), and 12 wt % solution of PVDF in n-methyl pyrolidone (NMP, Kureha Co., Ltd., PVdF1120) in a mixer. The mixture was coated on a 20 μm thick aluminum foil substrate. The result was dried so as to provide a cathode active material 90 wt % $LiMn_2O_4$, 5 wt % carbon fiber, and 5 wt % PVDF. Cathodes 15 mm in diameter were cut out of the result.

An electrolyte was prepared by dissolving $LiPF_6$ to 1.2 M in a 35/5/40/20 by volume mixture of ethylene carbonate (EC)/propylene carbonate (PC)/ethylmethyl carbonate (EMC)/diethyl carbonate (DEC).

A first cell was prepared according to FIG. 1 with the first anode, one of the first cathodes, the electrolyte, and a 25 μm thick polyethylene porous membrane separator (Tonen Co., Ltd.). A second cell was prepared according to FIG. 1 with the second anode, one of the first cathodes, the electrolyte, and a 25 μm thick polyethylene porous membrane separator (Tonen Co., Ltd.).

The cycle performance of each of the cells was measured by repeatedly charging and discharging the cells between 2.7 V and 4.2 V. During the formation of the passivation layer in the first 3 cycles, the cells were charged using constant current at a rate of C/10 followed by charging at constant voltage until the current falls to C/20. During the subsequent cycles, the cells were charged using constant current at a rate of 2C for 30 minutes followed by discharging at 5 C. The tests were carried out at 45° C.

Table 2 presents the cycling data for the first cell, and the second cell. The first cell has the anode that includes amorphous carbon while the second cell has the anode includes graphite. The capacity retention of the first cell is higher than the capacity retention of the second cell after 10 high rate cycles at 45° C. The temperature increase in the first cell is lower than in the second cell. Additionally, the increase in internal resistance is also lower in the first cell than in the second cell.

TABLE 2

| | Capacity ratio of 5 C/1 C discharge | After 10 cycles at 2 C charge and 5 C discharge | | |
|---|---|---|---|---|
| | | IR Increase | Capacity Loss | Peak Temperature |
| First Cell | 0.994 | 44% | 1.3% | 57.2° C. |
| Second Cell | 0.986 | 146% | 3.2% | 67.8° C. |

EXAMPLE 2

Figure 2:
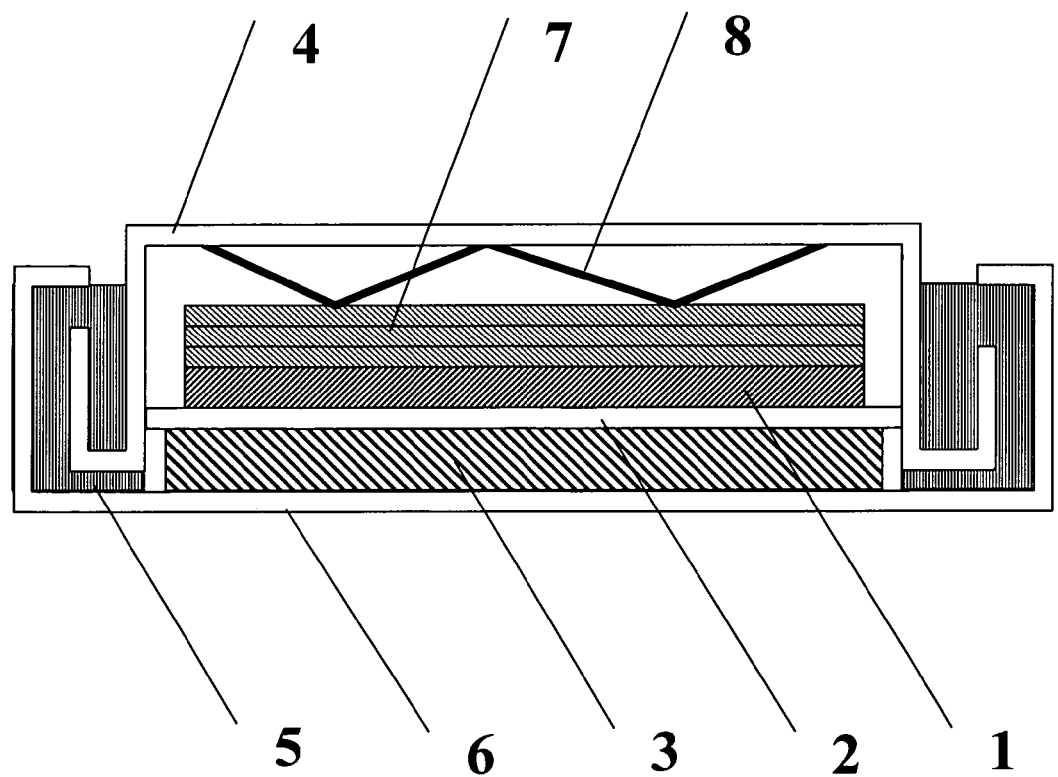
FIG. 2 illustrates a cross section of a button cell.

A variety of 2032 type button cells were generated having a structure according to FIG. 2. The button cells include a separator 2 positioned between a cathode 1 and an anode 3. The anode and cathode are positioned in a chamber defined by a case 4, a gasket 5 and a cover 6. A spacer 7 and a spring washer 8 are positioned between the cathode 1 and the case 4. The spacer 7 and spring washer 8 were made of stainless steel. An electrolyte positioned between the case 4 and the cover 6 activates the anode and the cathode.

A third electrolyte was prepared by dissolving $LiPF_6$ to 1.2 M in a 25/75 by volume mixture of ethylene carbonate (EC)/diethyl carbonate (DEC).

Second cathodes were generated by mixing $LiNi_{(1/3)}Co_{(1/3)}Mn_{(1/3)}O_2$ (Seimi Chemical Co., Ltd., L333), a 12 wt % solution of PVDF in n-methyl pyrolidone (NMP, Kureha Co., Ltd., PVDF1120), carbon black, and vapor grown carbon fiber (Showa Denko Co., VGCF) in a mixer. The mixture was coated on an aluminum substrate, dried, and pressed to a 54 μm thickness. The resulting cathode medium was about 85 wt % $LiNi_{(1/3)}Co_{(1/3)}Mn_{(1/3)}O_2$, 8 wt % PVDF, 5 wt % carbon black, and 2 wt % VGCF. Cathodes 15 mm in diameter were cut out of the result.

Third anodes were generated by mixing hard carbon powder (Kureha Co., Ltd., Carbotron-F), a 13 wt % solution of PVdF in n-methyl pyrolidone (NMP, Kureha Co., Ltd., PVDF9130), and vapor grown carbon fiber (Showa Denko Co., VGCF) in a mixer. The mixture was coated onto a 10 μm thickness of copper foil, dried, and pressed to a 54 μm thickness. The resulting anode medium was about 91.65 wt % hard carbon, 6 wt % PVDF, and 2.35 wt % VGCF. Anodes (16 mm in diameter) were cut out of the result.

Fourth anodes were generated by mixing Mesocarbon Microbeads (Osaka Gas Co., Ltd., MCMB 25-28), a 13 wt % solution of PVDF in n-methyl pyrolidone (NMP, Kureha Co., Ltd., PVdF9130), and vapor grown carbon fiber (Showa Denko Co., Ltd. VGCF,) in a mixer. The mixture was coated onto a 10 μm thickness of copper foil, dried and pressed to a 48 μm thickness. The result was dried so as to provide an anode active material that was 87.3 wt % MCMB, 10 wt % PVDF and 2.7 wt % VGCF. Anodes (16 mm in diameter) were cut out of the result.

A variety of button cells were generated with a structure according to FIG. 2. A third cell was generated with the third electrolyte, second cathodes, a third anode, and a 25 μm thick polyethylene porous membrane separator (Tonen Co., Ltd.). A fourth cell was generated with the third electrolyte, one of the second cathodes, a fourth anode, and a 25 μm thick polyethylene porous membrane separator (Tonen Co., Ltd.). Each of the button cells had an effective area of about 1.8 $cm^2$.

The cycle performance of each of the cells was measured by repeatedly charged and discharged between 2.7 V and 4.2 V during formation of a passivation layer and between 2.7 V and 4.3 V during the subsequent nine cycles. During the formation of the passivation layer in the first four cycles, the cells were charged using constant current at a rate of C/20 followed by charging at constant voltage until the current falls to C/50. During these same four cycles, the cells were discharged at C/10. During cycles 5 and 6, the cells were charged using constant current at a rate of C/10 followed by charging at constant voltage until the current comes down to C/20. During the same two cycles, the cells were discharged at C/5. During the subsequent nine cycles, the cells were charged using constant current at a rate of C/5 followed by charging at constant voltage until the current falls to C/20. During these same nine cycles, the cells were first discharged at constant current at a rate of C/10 for conditioning and then at C/10, C/5, C/2, 1C, 2C, 5C, 10C, and 15 C for rate testing. The tests were carried out at 25° C.

Figure 3:
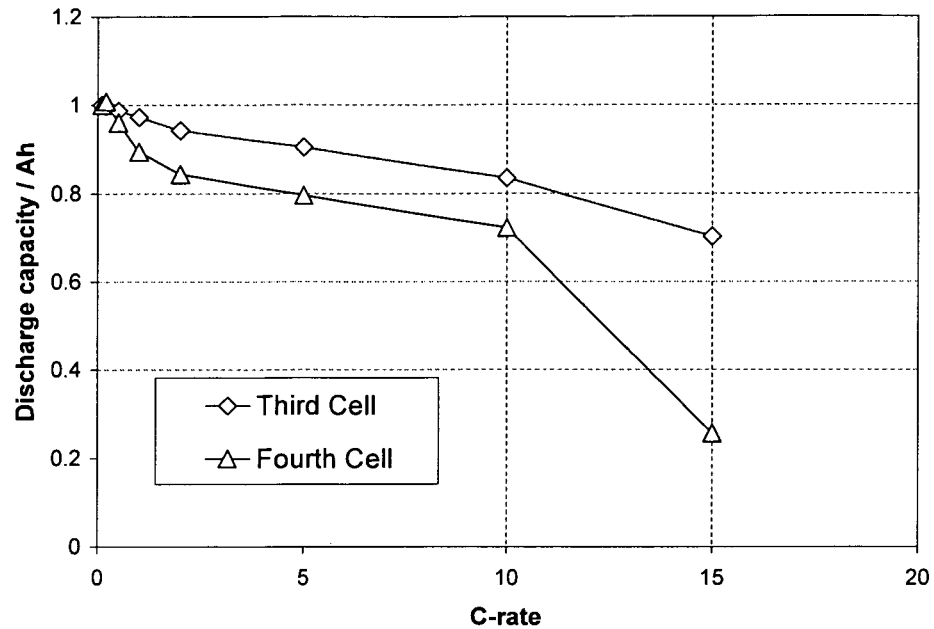
FIG. 3 compares the cycling performance of a battery having an anode that includes amorphous carbon against the cycling performance of a battery having an anode that includes graphite.

FIG. 3 presents the cycling data for the third cell and the fourth cell The third cell has an anode with amorphous carbon while the fourth cell had an anode with MCMB. The cell with the amorphous carbon showed enhanced discharge retention above the 5C rate relative to the cells without the amorphous carbon.

EXAMPLE 3

A third cathode was prepared by mixing $LiFePO_4$ (Olivine, Argonne National Laboratory), a 12 wt % solution of PVDF in n-methyl pyrolidone (NMP, Kureha Co., Ltd., PVDF1120), carbon black, and vapor grown carbon fiber (Showa Denko Co., VGCF) in a mixer. The mixture was coated on an aluminum substrate, dried, and pressed to a 61 μm thickness. The resulting cathode medium was about 85 wt % $LiFePO_4$, 8 wt % PVDF, 5 wt % carbon black, and 2 wt % VGCF. Cathodes 15 mm in diameter were cut out of the result.

A fifth cell was prepared according to FIG. 2 with a third anode, a third cathode, the third electrolyte, and a 25 μm thick polyethylene porous membrane separator (Tonen Co., Ltd.). A sixth cell was prepared according to FIG. 2 with the fourth anode, a third cathode, the third electrolyte, and a 25 μm thick polyethylene porous membrane separator (Tonen Co., Ltd.).

The cycle performance of each of the cells was measured by repeatedly charged and discharged between 2.5 V and 3.9 V during formation of a passivation layer and between 2.5 V and 3.9 V during the subsequent nine cycles. During the formation of the passivation layer in the first four cycles, the cells were charged using constant current at a rate of C/20 followed by charging at constant voltage until the current falls to C/50. During these same four cycles, the cells were discharged at C/10. During cycles 5 and 6, the cells were charged using constant current at a rate of C/10 followed by charging at constant voltage until the current comes down to C/20. During the same two cycles, the cells were discharged at C/5. During the subsequent nine cycles, the cells were charged using constant current at a rate of C/5 followed by charging at constant voltage until the current falls to C/20. During these same nine cycles, the cells were first discharged at constant current at a rate of C/10 for conditioning and then at C/10, C/5, C/2, 1C, 2C, 5C, 10C, and 15 C for rate testing. The tests were carried out at 25° C.

Figure 4:
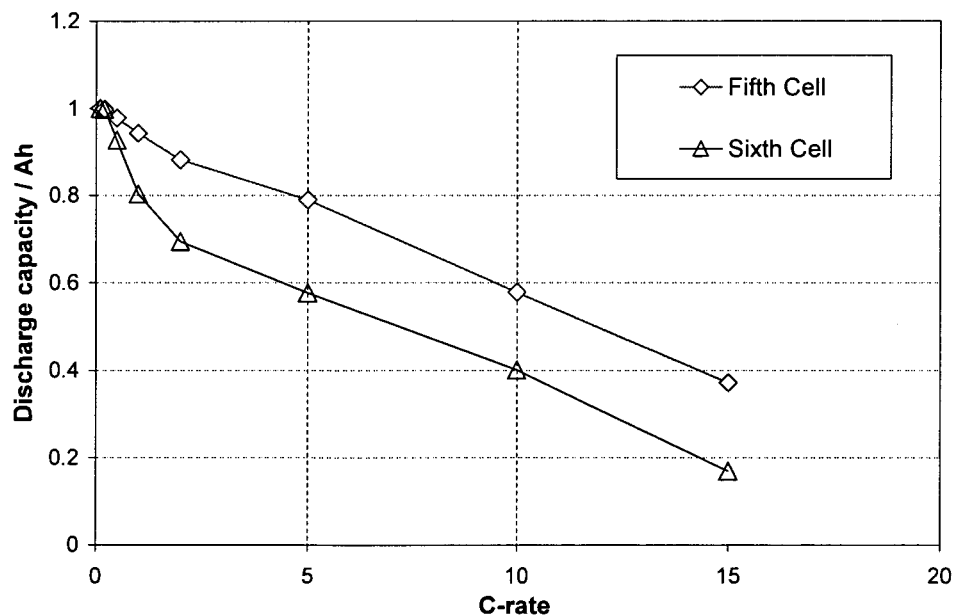
FIG. 4 compares the discharge capacity performance of a battery having an anode that includes amorphous carbon against the cycling performance of a battery having an anode that includes graphite. The batteries each have a cathode that includes $LiFePO_4$.

FIG. 4 presents the cycling data for the fifth cell and the sixth cell. The fifth cell had an anode with amorphous carbon while the fifth cell excluded amorphous carbon. The fifth cell showed a higher discharge capacity retention at higher than C/2 rate relative to the sixth cell.

EXAMPLE 4

The exothermic peak temperatures of four different cathode active media were measured by differential scanning calorimetry. Four cathodes were prepared by mixing a 12 wt % solution of PVDF in n-methyl pyrolidone (NMP, Kureha Co., Ltd., PVDF1120), carbon black, and a cathode active material in a mixer. The cathode active materials were $LiCoO_2$, $LiMn_2O_4$, $LiNiCoMnO_2$, and $LiFePO_4$. Each mixture was coated on a 20 μm thick aluminum substrate, dried, and pressed to a 130 μm thickness. The result was a cathode active medium with about 7 wt % carbon black, 7 wt % PVdF, and 86 wt % of the cathode active material. Cathodes 15 mm in diameter were cut out of the result.

Cells were prepared according to FIG. 2 with a lithium metal anode, one of the cathodes, the third electrolyte, and a 25 μm thick polyethylene porous membrane separator (Tonen Co., Ltd.).

The cells were charged with a specific current of 14 mA/g to 4.2 V (3.8 in the case of the $LiFePO_4$ active material). The cathode medium was then extracted from the charged cells and placed in a stainless steel differential scanning calorimetry cell. The differential scanning calorimetry cell was heated at 2° C./min in an argon atmosphere. The signals were measured from 30° C. to 400° C. The results are presented above in Table 1.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A secondary battery, comprising:
   one or more anodes that include carbon fiber coated directly on amorphous carbon with the carbon fiber being in contact with the amorphous carbon and fused directly to the amorphous carbon such that a bond between the amorphous carbon and carbon fibers is in accordance with a bond formed by compressing the carbon fiber and amorphous carbon while applying shear stress between the fiber and amorphous carbon;
   one or more cathodes; and
   an electrolyte in contact with the one or more anodes, the electrolyte including one or more lithium salts in a solvent.

2. The battery of claim 1, wherein the one or more anodes exclude graphite.

3. The battery of claim 1, wherein the carbon fiber includes vapor grown carbon fiber.

4. The battery of claim 1, wherein at least one of the one or more cathodes includes an active medium having an exothermic peak temperature above 250° C. as measured by differential scanning calorimetry in an argon atmosphere when the battery is initially charged and when the electrolyte includes 1.0 M $LiPF_6$ in a ½ by volume mixture of ethylene carbonate (EC) /diethyl carbonate (DEC).

5. The battery of claim 1, wherein at least one of the one or more cathodes includes an active material selected from a group consisting of: spinel, olivine, and lithium nickel cobalt manganese oxide.

6. The battery of claim 1, wherein at least one of the one or more cathodes includes $LiNi_{(1/3)}Co_{(1/3)}Mn_{(1/3)}O_2$.

7. The battery of claim 1, wherein the electrolyte includes an organic solvent.

8. The battery of claim 1, wherein the amorphous carbon is more than 50 wt% of the active materials in at least one of the one or more anodes.

9. The battery of claim 1, wherein the amorphous carbon is selected from a group consisting of: hard carbon and soft carbon heat treated at less than 2000° C.

10. The battery of claim 1, wherein at least one of the one or more anodes includes the amorphous carbon and the carbon fiber in an anode medium on a substrate, the anode medium having a thickness less than 100 μm.

11. The battery of claim 10, wherein at least one of the one or more cathodes has a cathode medium thickness less than 130 μm.

12. The battery of claim 1, wherein at least one of the one or more anodes include the carbon fibers in a range of 1 wt% to 6 wt% of the amorphous carbon.

13. The battery of claim 1, wherein at least one of the one or more anodes includes the amorphous carbon as an active material and the carbon fiber is in a range of 1 wt% to 6 wt% of the active materials.

14. The battery of claim 1, wherein the carbon fiber and amorphous carbon are included in an anode medium positioned on an anode substrate, the anode medium being in accordance with a medium formed by drying a slurry on the anode substrate where the carbon fiber was coated directly on the amorphous carbon before formation of the slurry.

* * * * *